United States Patent [19]
Yanagihara et al.

[11] 4,116,191
[45] Sep. 26, 1978

[54] INTERNAL COMBUSTION ENGINE WITH AN AUXILIARY CHAMBER

[75] Inventors: Hiromichi Yanagihara; Nobuo Habu, both of Susono, Japan

[73] Assignee: Toyota Jidosha Kogyo Kabushiki Kaisha, Toyota, Japan

[21] Appl. No.: 799,097

[22] Filed: May 20, 1977

[30] Foreign Application Priority Data

Apr. 6, 1977 [JP] Japan .............................. 52-42020[U]

[51] Int. Cl.² ......................... F02B 19/08; F02B 17/00
[52] U.S. Cl. ............................... 123/30 D; 123/32 L; 123/32 SP; 123/191 S
[58] Field of Search ................. 123/30 C, 30 D, 32 C, 123/32 K, 32 L, 32 ST, 32 SP, 33 D, 191 S, 191 SP

[56] References Cited

U.S. PATENT DOCUMENTS

| 2,808,036 | 10/1957 | Von Seggern et al. | 123/32 SP |
| 3,754,535 | 8/1973 | Hofbauer | 123/32 SP X |
| 4,038,959 | 8/1977 | Takizawa et al. | 123/191 S |

FOREIGN PATENT DOCUMENTS

| 986,326 | 7/1951 | France | 123/32 SP |
| 645,221 | 10/1950 | United Kingdom | 123/32 C |

Primary Examiner—Charles J. Myhre
Assistant Examiner—Tony M. Argenbright
Attorney, Agent, or Firm—Stevens, Davis, Miller & Mosher

[57] ABSTRACT

Disclosed is an internal combustion engine comprising a main chamber and an auxiliary chamber which are interconnected with each other via a connecting passage. An annular raised portion is formed in the inner wall of the auxiliary chamber so as to divide the auxiliary chamber into a first auxiliary chamber and a second auxiliary chamber. The connecting passage is tangentially connected to the second auxiliary chamber for creating a strong swirl motion in the first auxiliary chamber. This strong swirl motion causes a secondary swirl motion in a portion of the recess, which is located at a position opposite to the inner wall to which the connecting passage is tangentially connected with respect to the axis of the auxiliary chamber. The nozzle of a fuel injector is disposed in the auxiliary chamber so as to be directed to the recess portion for forming a rich air-fuel mixture therein. The spark gap of a spark plug is located in the recess portion. An additional connecting passage communicating the recess portion with the main chamber is formed in the cylinder head and is tangentially connected to the inner wall of the recess portion for strengthening the secondary swirl motion.

4 Claims, 2 Drawing Figures

INTERNAL COMBUSTION ENGINE WITH AN AUXILIARY CHAMBER

DESCRIPTION OF THE INVENTION

The present invention relates to the construction of a combustion chamber in an internal combustion engine provided with an auxiliary chamber.

There has been known an internal combustion engine in which its combustion chamber comprises a main chamber and an auxiliary chamber which are interconnected with each other via a connecting passage, and the auxiliary chamber has a volume of more than 80 percent relative to the total volume of the combustion chamber. The auxiliary chamber is divided into a first auxiliary chamber and a second auxiliary chamber by an annular raised portion forming a circular restricted opening. The connecting passage is tangentially connected to the inner wall of the second auxiliary chamber located at a position near the main chamber, and a recess is formed on the inner wall of the second auxiliary chamber beneath the annular raised portion at a position located opposite to the inner wall to which the connecting passage is tangentially connected with respect to the axis of the auxiliary chamber. The spark plug of a spark gap is located in the recess or in the vicinity of the recess, and the nozzle of a fuel injector is arranged in the auxiliary chamber so that a rich air-fuel mixture is formed in the recess. In operation, at the time of the intake stroke, a suction gas such as air or a lean air-fuel mixture, or a suction gas containing a recirculated exhaust gas therein is introduced into the main chamber. Then, at the time of the compression stroke, the suction gas is forced into the auxiliary chamber via the connecting passage. As is mentioned above, since the connecting passage is arranged so as to be tangentially connected to the inner wall of the second auxiliary chamber, the suction gas forced into the auxiliary chamber causes a swirl motion in the auxiliary chamber and, as a result, a secondary swirl motion is caused in the recess by the swirl motion created in the auxiliary chamber. A large part of the fuel injected from the fuel injector towards the recess when a weak swirl motion is created in the auxiliary chamber is caused to adhere to the inner wall of the recess, and the remaining small part of the fuel enters into the first auxiliary chamber. As a result of this, a swirling lean air-fuel mixture is created in the first auxiliary chamber. The vaporization of the liquid fuel adhering to the inner wall of the recess is promoted by the secondary swirl motion created in the recess and by the heat of the inner wall of the recess and, as a result, a rich air-fuel mixture is formed in the recess. After this, the rich air-fuel mixture thus formed is ignited by the spark plug.

In order to improve ignition in an internal combustion engine of the above described type, it is necessary to form a rich air-fuel mixture of an optimum air-fuel ratio in the recess and, in addition, in order to obtain a stable combustion, it is necessaary that the flame of the rich air-fuel mixture rapidly propagate into all of the space of the auxiliary chamber. As mentioned above, the vaporization of the liquid fuel adhering to the inner wall of the recess is promoted by the secondary swirl motion created in the recess. However, this secondary swirl motion is not so strong that the liquid fuel adhering to the inner wall of the recess is instantaneously vaporized and that the flame of the rich air-fuel mixture rapidly propagates into the auxiliary chamber.

An object of the present invention is to provide an internal combustion engine capable of instantaneously vaporizing the liquid fuel adhering to the inner wall of the recess and also capable of rapidly propagating the flame into the auxiliary chamber.

According to the present invention, there is provided an internal combustion engine comprising: a cylinder block having a cylinder bore therein; a cylinder head having a cavity therein and mounted on said cylinder block, said cavity having an inner wall which defines an auxiliary chamber with an axis; a piston reciprocally movable in said cylinder bore, said piston and said cylinder head forming a main chamber therebetween; an intake valve movably mounted on said cylinder head for leading gas into said main chamber; an exhaust valve movably mounted on said cylinder head for discharging exhaust gas into the atmosphere; an annular raised portion formed on the inner wall of said auxiliary chamber around the axis of said auxiliary chamber and forming a recess on the inner wall of said auxiliary chamber beneath said annular raised portion, said annular raised portion dividing said auxiliary chamber into a first chamber and a second chamber which are arranged in tandem along the axis of said auxiliary chamber; a connecting passage communicating said auxiliary chamber with said main chamber and arranged to be tangentially connected to the inner wall of said second auxiliary chamber for forming a strong swirl motion in said first auxiliary chamber, said recess having a recess portion at a position opposite to the inner wall to which said connecting passage is tangentially connected with respect to the axis of said auxiliary chamber; a fuel injector having an injecting nozzle disposed in said auxiliary chamber and directed to said recess portion for forming a rich air-fuel mixture therein; a spark plug having a spark gap located in said recess portion for igniting the rich air-fuel mixture formed in said recess portion, and; a connecting hole communicating said recess portion with said main chamber and arranged to be tangentially connected to the inner wall of said recess portion for strengthening a swirl motion in said recess portion, which is caused by the strong swirl motion created in said first chamber.

The present invention may be more fully understood from the following description of a preferred embodiment of the invention, together with the accompanying drawings.

DESCRIPTION OF A PREFERRED EMBODIMENT

Figure 1:
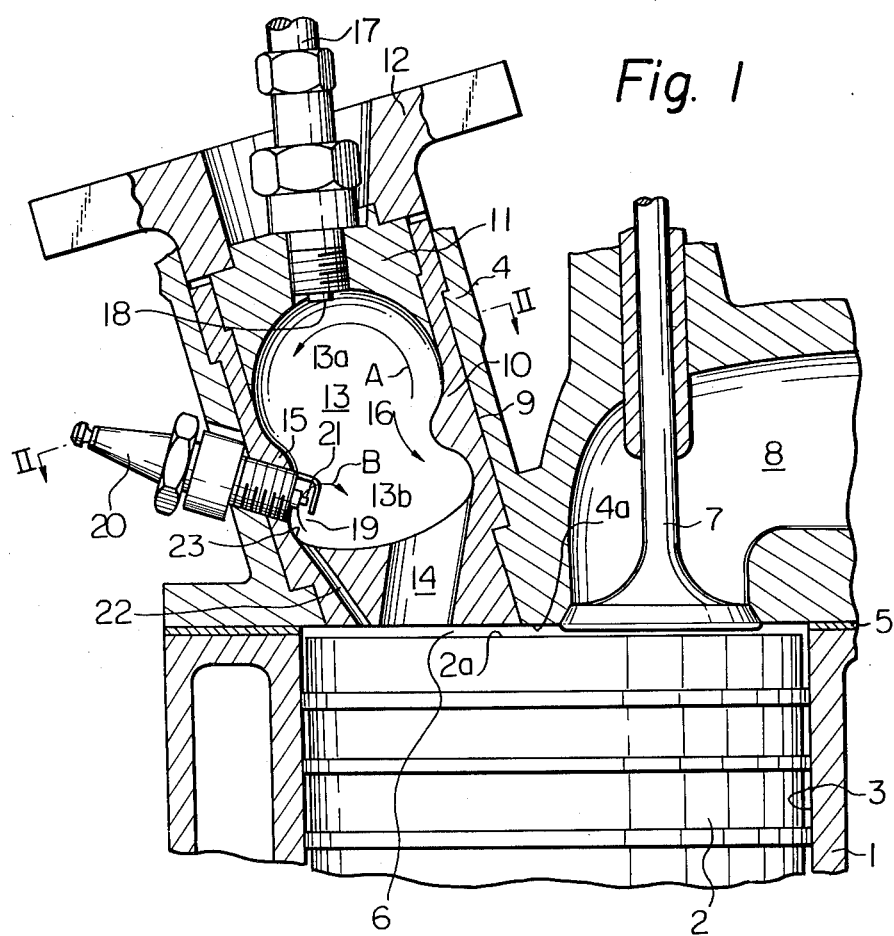
FIG. 1 is a cross-sectional side view of an internal combustion engine according to the present invention.

Referring to FIG. 1, 1 designates a cylinder block, 2 a piston reciprocally movable in a cylinder bore 3 and having a flat top surface 2a, 4 a cylinder head fixed onto the cylinder block 1 via a gasket 5 and having a flat inner wall 4a, 6 a main chamber, 7 an intake valve, and 8 an intake port. In addition, an exhaust valve (not shown) is movably mounted on the cylinder head 4. A hole 9 having a circular cross-section is formed in the cylinder head 4, and an auxiliary chamber component 10 is fitted into the hole 9. In addition, another auxiliary chamber component 11 is fitted into the upper portion of the auxiliary chamber component 10. The auxiliary chamber components 10 and 11 are rigidly fixed onto the cylinder head 4 by a fixing plate 12 fixed onto the cylinder head 4 by means of bolts (not shown). An auxiliary chamber 13 is formed in the auxiliary chamber components 10 and 11 and is connected to the main chamber 6 via a connecting passage 14 formed in the auxiliary chamber component 10. In addition, the total volume of the auxiliary chamber 13 and the connecting passage 14 is set so as to be more than 80 percent of the total volume of the auxiliary chamber 13, the connecting passage 14 and the main chamber 6 when the piston reaches the top dead center as is shown in FIG. 1.

Figure 2:
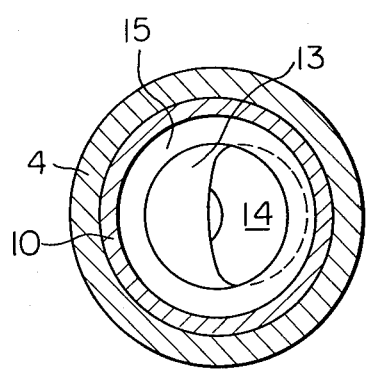
FIG. 2 is a cross-sectional view taken along the line II—II in FIG. 1.

The shape of the inner wall of the auxiliary chamber 13 is formed along a surface of revolution, that is, a symmetrical surface formed around the longitudinal axis of the auxiliary chamber 13. Thus, as shown in FIG. 2, the cross-sectional shape of the auxiliary chamber 13 is circular. As shown in FIG. 1, an annular raised portion 15 having a smoothly curved line in a longitudinal cross-section is formed on the inner wall of the auxiliary chamber component 10, and a restricted opening 16 having a circular cross-section is formed by the annular raised portion 15. However, it is not necessary to always form the restricted opening 16 in the shape of a circular cross-section. The cross-sectional shape of the restricted opening 16 may be formed in the shape of an elliptical cross-section instead of forming the restricted opening 16 in the shape of a circular cross-section. The auxiliary chamber 13 is divided into a first auxiliary chamber 13a and a second auxiliary chamber 13b by the annular raised portion 15.

The inner wall of the first auxiliary chamber 13a is formed in a spherical shape or in an approximate ellipsoid shape. On the other hand, the inner wall of the second auxiliary chamber 13b is formed in an ellipsoid shape. The upper end of the connecting passage 14 is tangentially connected to the inner wall of the second auxiliary chamber 13b, while the lower end of the connecting passage 14 opens into the periphery of the main chamber 6. A nozzle 18 of a fuel injector 17 is arranged at the apex of the first auxiliary chamber 13a so as to be directed to a recess 19 which is formed on the inner wall of the second auxiliary chamber 13b beneath the annular raised portion 15 at a position opposite to the inner wall to which the connecting passage 14 is tangentially connected with respect to the axis of the auxiliary chamber 13. In addition, a connecting hole 22 communicating the recess 19 with the main chamber 6 is formed in the auxiliary chamber component 10 and is tangentially connected to an inner wall 23 of the recess 19, which depicts a smoothly curved line in a longitudinal cross-section. A spark gap 21 of a spark plug 20 is located in the recess 19. Since the engine shown in FIG. 1 is provided with no throttle valve, the intake port 8 is directly connected to an air cleaner (not shown) or to the air cleaner via a carburetor (not shown) having no throttle valve and forming a lean air-fuel mixture. Therefore, in this engine, the regulation of the load of the engine is carried out by regulating an amount of the fuel injected from the fuel injector 17. In addition, the exhaust gas may be recirculated into the intake port 8.

In operation, at the time of the intake stroke, a suction gas such as air or a lean air-fuel mixture, or a suction gas containing a recirculated exhaust gas therein, is introduced into the main chamber 6 via the intake valve 7. Then, at the time of the compression stroke, the suction gas is forced into the auxiliary chamber 13 via the connecting passage 14. The suction gas forced into the auxiliary chamber 13 passes through the second auxiliary chamber 13b and, then, enters into the first auxiliary chamber 13a, thus causing a strong swirl motion as shown by the arrow A in the first auxiliary chamber 13a. On the other hand, a secondary swirl motion, as shown by the arrow B, is caused in the recess 19 by the strong swirl motion A. In addition, since the suction gas in the main chamber 6 is injected into the recess 19 via the connecting hole 22, an extremely strong secondary swirl motion B is created in the recess 19. The injecting operation of the fuel injector 17 is started when the piston reaches approximately bottom dead center at the beginning of the compression stroke. This injecting operation is completed when the piston reaches a point corresponding to approximately 120° before top dead center. While a large part of the fuel injected from the fuel injector 17 towards the recess 19 remains in the recess 19, the remaining small part of the fuel is introduced into the first auxiliary chamber 13a via the second auxiliary chamber 13b. Then, a part of the fuel introduced into the first auxiliary chamber 13a is again returned to the second auxiliary chamber 13b. As stated previously, a strong secondary swirl motion B is created in the recess 19. Therefore, the vaporization of the liquid fuel adhering to the inner wall of the recess is promoted by the strong secondary swirl motion and by the heat of the inner wall of the recess 19. As a result, a rich air-fuel mixture of an optimum air-fuel ratio is formed in the recess 19. After this, the rich air-fuel mixture formed in the recess 19 is ignited by the spark plug 20. While a part of the flame of the rich air-fuel mixture thus ignited is injected into the main chamber 6 via the connecting passage 14, the remaining large part of the flame is propagated into the first auxiliary chamber 13a via the restricted opening 16. While an extremely lean air-fuel mixture is being formed in the first auxiliary chamber 13a, the flame propagating into the first auxiliary chamber 13a swirls in the first auxiliary chamber 13a together with the strong swirl motion A. As a result of this, the combustible mixture in the first auxiliary chamber 13a is rapidly and almost completely burned.

As mentioned above, by creating a strong secondary swirl motion in the recess 19, the vaporization of the liquid fuel adhering to the inner wall 23 of the recess 19 is promoted and, as a result, a rich air-fuel mixture of an optimum air-fuel ratio is formed in the recess 19. In addition, since the flame of the rich air-fuel mixture rapidly spreads into all of the space of the auxiliary chamber 13 due to the strong swirl motion A created in the auxiliary chamber 13, the combustion speed can be quickened.

According to the present invention, since a rich air-fuel mixture of an optimum air-fuel ratio is always formed in the recess 19, ignition can be always carried out. In addition, since the combustion speed in the auxiliary chamber is quickened, a stable combustion can be obtained.

While the invention has been described by reference to a specific embodiment chosen for purposes of illustration, it should be apparent that numerous modifications could be made thereto by those skilled in the art without departing from the spirit and scope of the invention.

What is claimed is:

1. An internal combustion engine comprising:

a cylinder block having a cylinder bore therein;

a cylinder head having a cavity therein and mounted on said cylinder block, said cavity having an inner wall which defines an auxiliary chamber with an axis;

a piston reciprocally movable in said cylinder bore, said piston and said cylinder head forming a main chamber therebetween;

an intake valve movably mounted on said cylinder head for leading gas into said main chamber;

an exhaust valve movably mounted on said cylinder head for discharging exhaust gas into the atmosphere;

an annular raised portion formed on the inner wall of said auxiliary chamber around the axis of said auxiliary chamber and forming a recess on the inner wall of said auxiliary chamber beneath said annular raised portion, said annular raised portion dividing said auxiliary chamber into a first chamber and a second chamber which are arranged in tandem along the axis of said auxiliary chamber;

a connecting passage communicating said auxiliary chamber with said main chamber and arranged to be tangentially connected to the inner wall of said second auxiliary chamber for forming a strong swirl motion in said first auxiliary chamber, said recess having a recess portion at a position opposite to the inner wall to which said connecting passage is tangentially connected with respect to the axis of said auxiliary chamber;

a fuel injector having an injecting nozzle disposed in said auxiliary chamber and directed to said recess portion for forming a rich air-fuel mixture therein;

a spark plug having a spark gap located in said recess portion for igniting the rich air-fuel mixture formed in said recess portion, and;

a connecting hole communicating said recess portion with said main chamber and arranged to be tangentially connected to the inner wall of said recess portion for strengthening a swirl motion in said recess portion, which is caused by the strong swirl motion created in said first chamber.

2. An internal combustion engine as claimed in claim 1, wherein said second chamber has a smooth inner wall formed in an ellipsoid, said connecting hole being smoothly connected to the inner wall of said recess portion.

3. An internal combustion engine as claimed in claim 1, wherein said second chamber has a smooth inner wall formed in an ellipsoid, said connecting passage being smoothly connected to the inner wall of said recess.

4. An internal combustion engine as claimed in claim 1, wherein the total volume of said auxiliary chamber and said connecting passage is more than 80 percent of the total volume of said auxiliary chamber, said connecting passage and said main chamber when the piston reaches the top dead center.

* * * * *